(12) United States Patent
DeNies et al.

(10) Patent No.: US 7,197,137 B1
(45) Date of Patent: Mar. 27, 2007

(54) INTERFACE CLASS DISCOVERY METHOD AND DEVICE

(75) Inventors: Steven G. DeNies, East Aurora, NY (US); Robert H. Fritzinger, Williamsville, NY (US); Joseph S. Ott, Depew, NY (US); Thomas J. Greier, Buffalo, NY (US)

(73) Assignee: Intel Corporation, Santa Clara, CA (US)

( * ) Notice: Subject to any disclaimer, the term of this patent is extended or adjusted under 35 U.S.C. 154(b) by 1288 days.

(21) Appl. No.: 09/593,532

(22) Filed: Jun. 14, 2000

Related U.S. Application Data (60) Provisional application No. 60/139,112, filed on Jun. 14, 1999.

(51) Int. Cl.
*H04M 1/00* (2006.01)
(52) U.S. Cl. .................... 379/399.01; 379/419
(58) Field of Classification Search ........... 379/399.01, 379/387.01, 22, 27.01, 32.01; 340/2.1; 370/351; 324/66, 539
See application file for complete search history.

(56) References Cited

U.S. PATENT DOCUMENTS

| | | | |
|---|---|---|---|
| 5,333,177 A | 7/1994 | Braitberg et al. | ............. 379/59 |
| 5,649,001 A | 7/1997 | Thomas et al. | .......... 379/93.07 |
| 5,715,296 A | 2/1998 | Schornack et al. | ............ 379/58 |
| 5,892,823 A * | 4/1999 | Stelman | ................. 379/390.01 |

FOREIGN PATENT DOCUMENTS

| | | |
|---|---|---|
| EP | 0 762 693 A2 | 8/1996 |
| JP | 06085848 | 3/1994 |
| WO | WO 99/37076 A1 | 7/1999 |

OTHER PUBLICATIONS

Dwyer, Roger F., "Use of the Kurtosis Statistic in the Frequency Domain as an Aid in Detecting Random Signals," IEEE Journal of Oceanic Engineering, ISSN 0364-9059, pp. 85-92, Apr. 1984 (abstract only).

* cited by examiner

*Primary Examiner*—Sinh Tran
*Assistant Examiner*—Walter F Briney, III
(74) *Attorney, Agent, or Firm*—Grossman, Tucker, Perreault & Pfleger, PLLC (57) ABSTRACT

Methods and devices of determining the interface class used on a communication pathway are disclosed. The method compares information derived from the communication pathway to information about known interface classes to determine whether the derived information is similar to the information corresponding to the known interface classes.

Devices according to the present invention include hardware and computer readable storage mediums having encoded instructions for carrying out the method.

22 Claims, 4 Drawing Sheets

INTERFACE CLASS DISCOVERY METHOD AND DEVICE

CROSS-REFERENCE TO RELATED APPLICATION

This application claims priority to an earlier filed U.S. provisional patent application having Ser. No. 60/139,112, which was filed on Jun. 14, 1999. This provisional patent application is hereby incorporated by this reference into this disclosure.

BACKGROUND OF THE INVENTION

1. Field of the Invention

The present invention relates to a device and method of discovering the type of telephone switch being used in a telephone system.

2. Description of the Prior Art

It is known in the prior art to determine the interface class of a telephony network by reading reference material corresponding to a device connected to the network. For example, a model number of a telephone is discovered by looking at the telephone, and then an owner's manual corresponding to the telephone is referenced. If the owner's manual lists the interface class used by the telephone, one can assume the interface class of the telephone is the interface class for the network. Alternatively, the vendor of the telephone may be contacted and asked to provide the interface class. These current methods of determining the interface class of a communication pathway, such as a telephony network, are time consuming.

SUMMARY OF THE INVENTION

An object of the present invention is to provide a method and device for determining the interface class of a communication pathway.

Accordingly, the present invention includes a method of providing an indication signal. First, a communication pathway carrying signals is provided, and an interface device is connected to the communication pathway. The interface device has conductors for carrying the signals provided by the communication pathway. Next, the signals carried by the conductors are analyzed to determine which of the conductors are active conductors. Then information about the active conductors or information about the signals carried by the active conductors is compared to information corresponding to a known interface class. If the active conductor information is similar to the interface class information, then a first type of indication signal is sent to indicate the similarity. However, if the active conductor information is not similar to the interface class information, then a second type of indication signal is sent to indicate the lack of similarity.

The present invention also includes devices for executing the method. One such device has a switch interface device connected to a computer, having software running thereon. Another device is a computer readable storage medium having encoded instructions capable of instructing a computer to execute the method of the present invention.

DESCRIPTION OF THE PREFERRED EMBODIMENT

Figure 1:
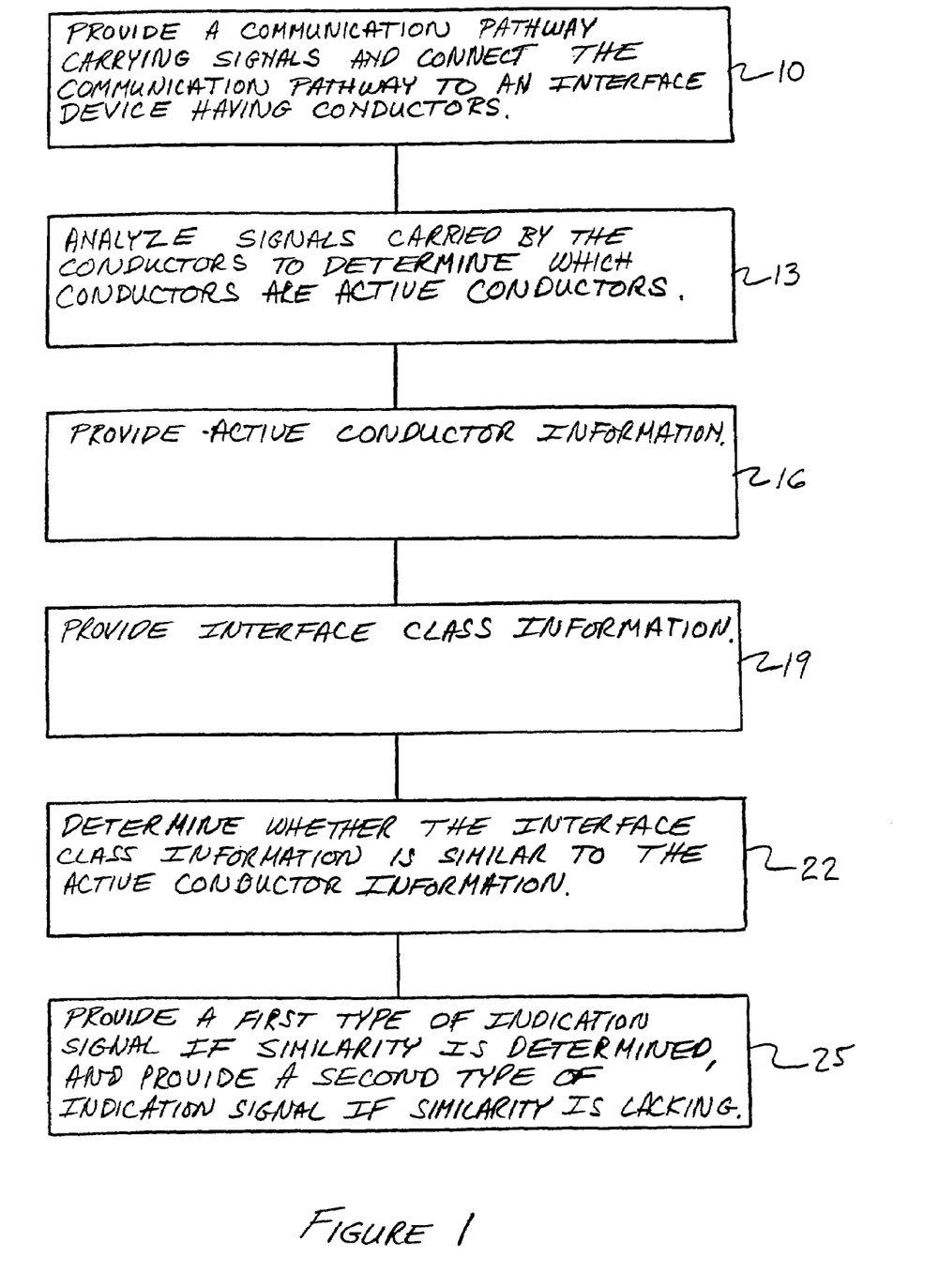
FIG. 1 shows steps of a method according to the present invention.
Figure 2:
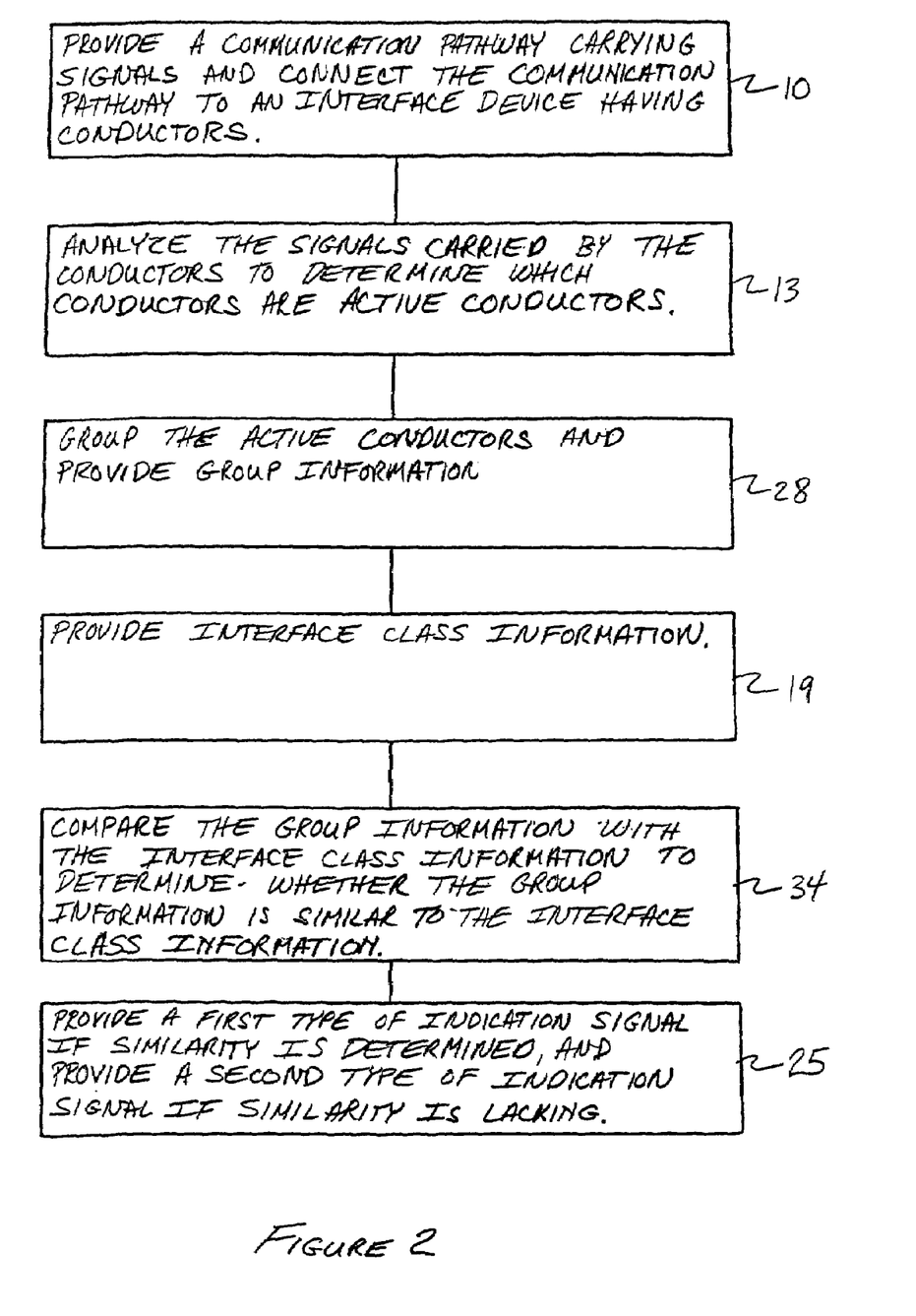
FIG. 2 shows steps of another method according to the present invention.

FIGS. 1 and 2 illustrate a method according to the present invention. The depicted method results in providing an indication signal. In one embodiment of the present invention, the indication signal is a first type if a possible interface class has been discovered, and is a second type if an interface class has been considered and found not to be a possible interface class. In the method, a communication pathway is provided and connected to an interface device having conductors (step 10). The communication pathway carries signals, and the conductors are capable of carrying the signals. In a telephony network, the conductors are commonly referred to as "pins."

Next, the signals carried by the conductors are analyzed to determine which of the conductors are active conductors (step 13), and active conductor information is provided (step 16). For example, the active conductor information may include a list of the active conductors. In a preferred embodiment of the method, the signals analyzed are restricted, for example by using an attenuator, to a desired voltage range. In one embodiment of the invention, the voltage range is restricted to between +5 volts and −5 volts.

In the method, interface class information is provided (step 19) and compared to the list of active conductor information. The interface class information preferably includes information about the active conductors for a known interface class. Then, a determination is made as to whether the interface class information is similar to the active conductor information (step 22). If the interface class information is determined to be similar to the active conductor information, then the first type of indication signal is provided (step 25). Alternatively, if the interface class information is determined not to be similar to the active conductor information, then the second type of indication signal is provided (step 25).

Analyzing the conductors to determine which of the conductors are active conductors (step 13) preferably includes selecting a conductor and analyzing the signal carried by the selected conductor to determine whether a voltage of the signal alternates. If the voltage of the signal carried by the selected conductor alternates, then the selected conductor may be considered a possible active conductor. Further analysis of the signal carried by a possible active conductor may be required to confirm a possible active conductor is in fact an active conductor.

The information about the active conductors for a known interface class may be considered to be similar to the active conductor information (step 22) if the information about the active conductors for the known interface class is among the active conductor information. For example, if it is determined conductors 1 through 6 are active, and a first interface class uses conductors 1 through 4 while a second interface class uses conductors 3 through 6, then both the first and second interface classes might be considered possible interface classes. In the example, further analysis of the signals carried by conductors 1 through 6 would be necessary to determine which interface class is the interface class used on the communication pathway. However, if a third interface class used conductor 7 or conductor 8, then the third interface class could be excluded from the possible interface classes that could be in use on the communication pathway.

It may be beneficial to determine which conductors are active conductors (step 13) by excluding inactive conductors from consideration. To do so, a preferred embodiment of the present invention determines which conductors carry a signal having an alternating voltage, and then determines an average amplitude voltage value for each of those conductors. Next, a reference amplitude voltage is determined, and a determination is made as to which of those conductors carrying an alternating voltage have an average amplitude voltage value less than the reference amplitude voltage. The reference amplitude voltage value may be determined by selecting the highest average amplitude voltage value of all conductors, and setting the reference amplitude voltage to some fraction of the highest average amplitude voltage value. For example, the fraction may be one-half.

In this embodiment of the method, determining the average amplitude voltage value for one of the conductors carrying a signal having an alternating voltage may include measuring the voltage amplitude of the signal carried by one of the conductors during a first period of time and during a second period of time. Then the maximum measured voltage amplitude during the first period of time is selected, and the maximum measured voltage amplitude during the second period of time is selected. The average of the selected maximum measured voltage amplitudes is determined to be the average amplitude voltage value.

Measuring the voltage amplitudes during the first and second periods of time is preferably done at a plurality of discrete times during each time period. The plurality of measurements corresponding to the plurality of discrete times during a time period can be considered an array of measurements for the time period.

If further analysis is required to determine the interface class corresponding to signals carried by the communication pathway, the conductors may be analyzed to determine which conductors are related to each other (step 28). Interface classes can be distinguished from each other by considering which conductors are grouped together. Customarily, two conductors will together provide a signal carried on a telephony network. From time to time herein the signal provided by more than one conductor is referred to as a "group signal." For example, one interface class might group conductors 1 and 2, and might also group conductors 3 and 6. A second interface class might group conductors 1 and 4 and might also group conductors 3 and 6. By determining which conductors corresponding to a communication pathway are grouped, it would be possible to determine whether the first or the second interface class was being used on the communication pathway.

FIG. 2 shows a method according to the present invention, wherein the grouping (sometimes referred to as "pairing") of conductors (step 28) may be determined by analyzing the signals carried by the conductors to determine which of the conductors are active conductors, and then grouping the active conductors into groups of active conductors. For example, in a telephony system, known interface classes pair the conductors, and so the groups of active conductors will each have two active conductors.

Then, primary interface class information, including information about the pairing of conductors for a known interface class, is provided (step 19) and compared (step 34) to the information about the groups of active conductors. If the pairing of conductors for the known interface class is similar to the group information, then a first type of a first indication signal is provided to indicate the known interface class is similar to the interface class used on the communication pathway. Alternatively, if the pairing of conductors for the known interface class is not similar to the group information, then a second type of the first indication signal is provided to indicate the known interface class is not similar to the interface class used on the communication pathway.

Grouping the active conductors (step 28) may be done by determining possible pairs of active conductors, and determining an auto correlation value corresponding to each possible pair of active conductors (the "pair auto correlation value"). As used herein, the term "auto correlation" refers to manipulation of data primarily corresponding to a single conductor. A threshold value is set and compared to the pair auto correlation value. Those possible pairs of active conductors having a pair auto correlation value below the threshold value are eliminated from further consideration.

The pair auto correlation value corresponding to a possible pair of active conductors may be determined by measuring a voltage amplitude of the signal carried by a first one of the active conductors at a plurality of discrete times during a first time period to provide a first array of voltage amplitudes. Next, each of the voltage amplitudes in the first array is squared. Then the squared voltage amplitudes are added together to provide a first sum of squares value. A second sum of squares value is determined for the first active conductor corresponding to a second time period in a manner similar to that used to provide the first sum of squares value. Next, third and fourth sum of squares values are determined for the second conductor corresponding to the first and second time periods in a manner similar to that used for the first and second sum of squares values respectively.

Then, a first auto correlation value is determined by adding the first sum of squares value to the second sum of squares value. Similarly, a second auto correlation value is determined by adding the third sum of squares value to the fourth sum of squares value. The auto correlation value corresponding to the possible pair of active conductors is the average of the first auto correlation value and the second auto correlation value.

After determining a pair auto correlation value for each possible pair of active conductors, the threshold value may be set equal to a multiple of the lowest pair auto correlation value. For example, the threshold value may be set at four times the lowest pair auto correlation value.

Another method for grouping the active conductors, that may be used in lieu of or in addition to that described above, utilizes a cross correlation value. As used herein, the term "cross correlation" refers to manipulation of data primarily corresponding to at least two conductors. In this method, a first active conductor and a second active conductor are selected to provide a possible pair of active conductors for analysis. A cross correlation value corresponding to the possible pair of active conductors (the "pair cross correlation value") is determined and compared to a threshold value. If the cross correlation value is less than the threshold value, the possible pair of active conductors is eliminated from further consideration.

In this method, a preferred threshold value is set equal to a fraction, for example one-half, of an auto correlation value corresponding to the possible pair of active conductors. The auto correlation value may be determined as described above.

The cross correlation value corresponding to a possible pair of active conductors may be determined by using the arrays of measurements used to determine the pair auto correlation values. Each measured voltage amplitude for one of the active conductors is multiplied by the corresponding measured voltage amplitude of the other conductor. It should be noted that measured voltage amplitudes multiplied together to arrive at the cross correlation value preferably are taken at about the same discrete time, i.e. "corresponding" measured voltage amplitudes referenced in the immediately prior sentence are those measured voltage amplitudes taken at the same discrete time. The multiplied measured voltage amplitudes are summed together to provide the cross correlation value corresponding to the possible pair of conductors.

After determining the groups of active conductors and comparing the groups to information corresponding to a known interface class, a determination is made as to whether the information corresponding to the known interface class is similar to the groups of active conductors (step 22). A preferred criteria for making this determination is to deem an interface class similar if each pair of conductors in the interface class is the same as a pair of conductors in a group.

For example, it may be determined the groups of active conductors on the communication pathway include a group comprised of conductors 1 and 3. If a first interface class pairs conductors 1 and 3 while a second interface class pairs conductors 1 and 4, then the first interface class is a candidate for being the interface class used on the communication pathway, but the second interface class is not.

After grouping the active conductors, and comparing the groups to known interface classes, more than one known interface class may be a candidate for the interface class used on the communication pathway. One method for determining which known interface class is the interface class used, involves analyzing the signals carried by the groups of conductors.

Interface classes of different encoding schemes may have different fourth moments. So, comparing the fourth moment of a known interface class to the fourth moment of a signal carried by the communication pathway can assist in determining which interface class corresponds to the signals carried by the communication pathway.

For example, the fourth moment of the group signal may be compared to information about the fourth moment of a signal carried by a corresponding pair of conductors of a known interface class. If the comparison results in a determination that the fourth moments are similar, then the interface class is selected as a possible interface class. Similarly, if the comparison results in a determination that the fourth moments are not similar, then the interface class is eliminated as a possible interface class. Preferably, similarity between the fourth moments is present if the fourth moment of the signal corresponding to the known interface class is within about 35% of the fourth moment of the group signal. If similarity between fourth moments is found, a first type of indication signal is provided, and if similarity between fourth moments is not found, a second type of indication signal is provided.

The fourth moment measures the relative peakedness or flatness of a distribution. The fourth moment for an array of voltage amplitudes is determined by determining the average voltage amplitude and the standard deviation of the voltage amplitudes. Next, the difference between each voltage amplitude measurement and the average amplitude is determined and divided by the standard deviation to produce a dividend corresponding to each measured voltage amplitude. Each dividend is then raised to the fourth power (hence the term "fourth moment") to provide a result corresponding to each measured voltage amplitude. The average of the results is the "fourth moment" referred to herein.

After comparing the groups of active conductors to information about all known interface classes, as described above, more than one known interface class may be similar, and further analysis may be needed to determine which known interface class is the most probable interface class being used on the communication pathway. One method of determining which known interface class is the most probable interface class is to analyze the spectral density corresponding to the signals sent via the communication pathway, and compare that spectral density to the spectral density of known interface classes. If the spectral densities are similar, then a first type of indication signal is provided, and if the spectral densities are not similar, then a second type of indication signal is provided.

It is known that the spectral density is dependent on the bit rate and encoding scheme used. Therefore, analyzing and comparing spectral densities may enable one to differentiate between possible interface classes used on the communication pathway.

One means of analyzing the spectral density is to use fast fourier transforms. A fast fourier transform is determined for each group signal (the "group FFT"), and information corresponding to each determined fast fourier transform (the "group FFT information") is compared to fast fourier transform information corresponding to signals carried by pairs of conductors for known interface classes (the "IC FFT information"). The group FFT information and the IC FFT information may be comprised of data points generated by the respective fast fourier transforms wherein frequency is the independent variable and voltage amplitude is the dependent variable. For example, these data points may be the product of the real and imaginary components of the fast fourier transform.

In one method, the group FFT information is normalized so the maximum data point of the group FFT information for one of the time periods is the same as the maximum data point of the IC FFT information. Then, a comparison is made between the normalized group FFT information and the IC FFT information to determine the similarity between the two sets of FFT information. The interface class resulting in the greatest similarity is selected as the most probable interface class being used on the communication pathway.

As an example, the similarity may be determined by subtracting the data points corresponding to the group FFT information from the corresponding data points for the IC FFT information to provide differential data points. In this context, the word "corresponding" in the immediately preceding sentence may refer, for example, to data points related to the same frequency. Then each of the resulting differential data points is squared and the sum of the squared data points is provided. The sum of the squared data points is referred to herein as the "squared error." The interface class corresponding to the lowest of the squared errors exhibits the greatest similarity, and is selected as the most probable interface class being used by the communication pathway.

It has been found that a preferred method of determining the similarity includes determining a normalized set of data points corresponding to the group FFT information, and a corresponding set of data points corresponding to the IC FFT information. Both data sets are smoothed, for example with a Savitzky-Golay filter, and then normalized. The squared error is determined from the smoothed and normalized information.

A Savitzky-Golay filter can be considered a weighted moving average. It replaces each data point, $f_i$ with a linear combination $g_i$ of itself and some number of nearby neighbors according to the following equation:

$$g_i = \sum_{n=-N_L}^{n=N_R} C_n f_{i+n}$$

In the equation, $N_L$ is the number of data points used to the left of the filtered data point and $N_R$ is the number to the right, or in the example given above, the number of data points used that are lesser in frequency and greater in frequency, respectively. Savitzky-Golay is a method of computing the coefficients, $c_n$. Chapter 14 of *Numerical Recipes In C*, second edition, written by William Press, Saul Teukolsky, William Vetterling and Brian Flannery, published by the Press Syndicate of the University of Cambridge in 1992, has more information about the Savitzky-Golay method. *Numerical Recipes In C*, is hereby incorporated by this reference.

The smoothing filter coefficients are computed via the Savitzky-Golay method, as described in Numerical Recipes in C. The coefficients are then used to smooth the data sets corresponding to the group FFT information and the IC FFT information. In one embodiment of the present invention, $N_L$ and $N_R$ were both equal to 128 and an order of 3 was used. The Savitzky-Golay method is preferably also applied to the interface class FFT information. Since the Savitzky-Golay method can widen main lobes and fill in nulls, the choice of coefficients used to smooth the data sets is preferably made to preserve the main lobe and the first null.

It should be noted at this point that the fourth moment of some interface classes is a function of the loop length. The measured fourth moment can be used to generate an estimate of the loop length. The loop length estimate can then be used to enhance the process of comparing spectral density taking the effects of loop length into consideration when determining the group FFT information.

The similarity between group signals and interface classes can be determined by comparing bit rate and encoding scheme information. The spectral density described above is one method of using these characteristics. Another method of determining bit rates uses a phase-lock-loop circuit ("PLL"). The PLL is applied against the incoming bit stream and indicates a lock when it identifies the bit rate. To do so, the PLL may need a broad dynamic range in order to meet the wide range of bit rates characteristic of communication pathways, such as those communication pathways supporting telephony switches.

Yet another method of determining the bit rate involves detecting zero crossings of the incoming bit stream. It should be noted the alternating signals that are characteristic of the communication pathway cross a zero (average) voltage level as they alternate between maximum and minimum voltage values. Zero (average) crossing timing is an indicator of the bit rate, as well as the bit rate precision that is characteristic of a particular interface class.

When the corresponding measured voltage amplitudes are taken at the same discrete time, the resulting correlation value (auto correlation or cross correlation) is referred to herein as a "zero lag correlation value." It should be noted that corresponding measured voltage amplitudes need not be taken at the same time. In some situations it may be beneficial to have corresponding measured voltage amplitudes that are taken at different times. For example, a time lag of 125 micro seconds, 250 micro seconds or 500 micro seconds has been found useful in determining which known interface class is used on a communication pathway. When the corresponding measured voltage amplitudes are taken at different times, the resulting correlation value is referred to by the time lag, for example a "125 micro second lag correlation value." The value in applying a lag to the correlation is to determine whether a signal exhibits any periodicity. Periodicity is another factor that may be used to distinguish an interface class. Some interface classes divide the signal into frame periods for conveying information, and may hence exhibit a periodic signal that can be determined through the use of a non-zero lag correlation.

Throughout the disclosure so far, various measurements have been described. It should be noted additional measurements may be made to provide more representative information. For example, it was stated the voltage amplitude of a signal is measured during a first time period and during a second time period. As is well known, two measurements often give less representative information than would, for example, ten measurements. The number of time periods and the number of discrete times within a time period should be selected to suit the particular situation. For example, in most telephony networks, sampling the voltage amplitude of a signal during ten time periods of 800 microseconds each, at a rate of 10 mega hertz, will produce sufficiently representative arrays.

A device 100 for carrying out the methods described above is shown in FIGS. 3 and 4. The device 100 includes a first connector 103 having a first set of conductors, a conductor selection device 106 and a second connector 109, which may include British Naval Connectors ("BNCs"). The first connector 103 is capable of connecting to a communication pathway 112 and carrying signals from the communication pathway 112 via the conductors. For example, the first connector 103 may be an RJ-45 jack. The conductor selection device 106 is connected to the first connector 103 and the second connector 109. Preferably, the conductor selection device is capable of selecting between the conductors, and connecting some of the conductors to the second connector 109.

Figure 3:
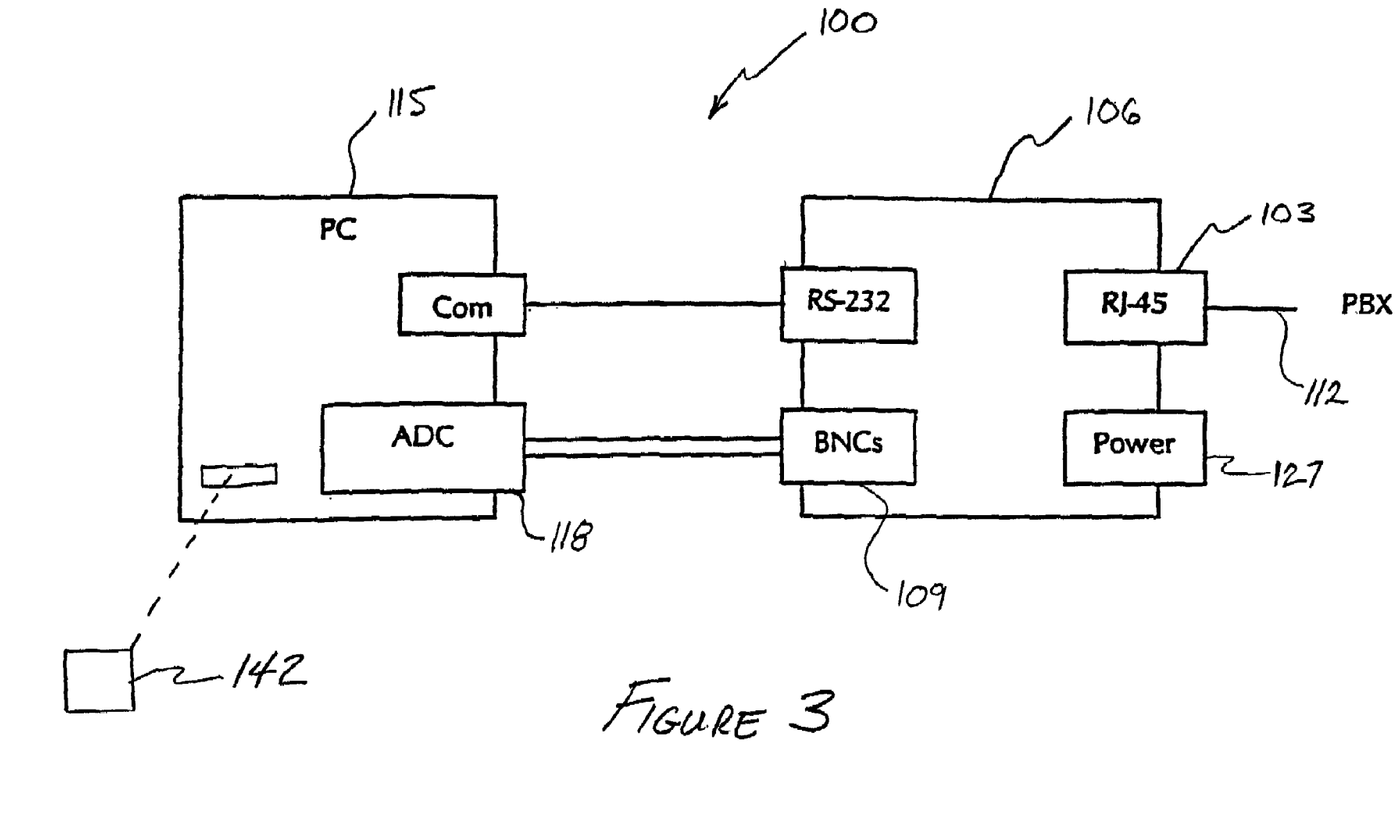
FIG. 3 shows devices according to the present invention.
Figure 4:
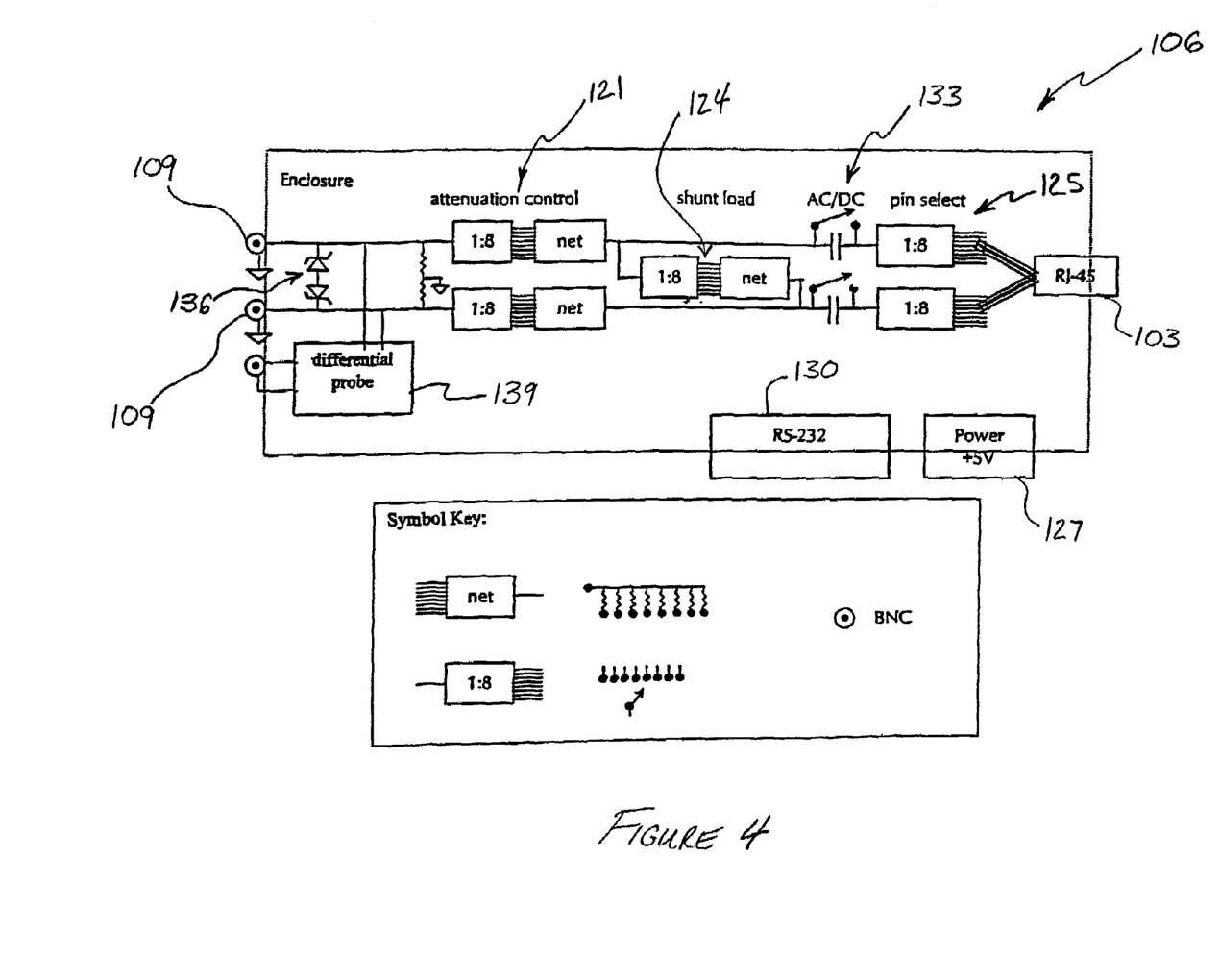
FIG. 4 shows more detail of conductor selection device shown in FIG. 3.

A computer 115 is connected to the second connector 109 and has software running thereon. An analog-digital converter 118 may be necessary for the computer 115 to interface with the second connector 109. In an embodiment of the present invention, the analog-digital converter 118 provides two channels of data acquisition with a maximum sampling rate of 10 million samples per second at 12 bit precision. A device driver for the computer 115 is advisable to provide a high level interface between the computer and the analog-digital converter 118.

The software is capable of instructing the computer 115 to determine which of the conductors are active. The software is also capable of instructing the computer 115 to compare the determined active conductors to information corresponding to a known interface (step 22), and then to instruct the computer to send a signal indicating whether the known interface is similar to the determined active conductors (step 25).

In a preferred embodiment of the device 100, the software is further capable of comparing a list of the active conductors to an interface class list, the interface class list identifying conductors used in transmitting signals according to the interface class, and if the list of the active conductors is similar to the interface class list, then instructing the computer 115 to send a signal identifying the interface class.

The software is preferably capable of instructing the computer 115 to determine which conductors are carrying signals representing differentially driven data corresponding to the same signal, and capable of instructing the computer 115 to group the conductors into conductor groups, wherein each conductor group represents conductors carrying differentially driven data corresponding to the same signal.

In addition, the software is further capable of instructing the computer 115 to determine whether the conductors in each conductor group are similar to sets of conductors used in transmitting signals according to an interface class. If the conductors in each group are similar to the sets of conductors, the software instructs the computer 115 to send a signal identifying the interface class. In addition, the software is further capable of controlling and monitoring the operation of relay matrixes 121, 124, 125, 133 within the conductor selection device 106.

The device according to the present invention may include an attenuator 121 connected between the first and second connectors 103, 109 for attenuating a signal carried between the first and second connectors 103, 109. The attenuator 121 is used to attenuate a signal from the communication pathway 112 so that the signal is within a range acceptable by other devices. The attenuator 121 may be a matrix of 8 double pole, single throw switches ("DPST") which can select a series resistance when used in conjunction with a 10 kilo ohm attenuation bypass resistor. Selection of an appropriate series resistance will form a simple voltage divider used to provide signal attenuation to extend the dynamic range of an analog-digital converter 118.

A shunt load device 124 may also be included to minimize a reflected signal by matching the interface class balanced impedance. As an example, a matrix of eight single pole, single throw ("SPST") switches can select a shunt load between two selected conductors. The shunt load device may provide seven discrete resistances plus a bypass. For example, the resistances may be 33 ohms, 51 ohms, 82 ohms, 120 ohms, 270 ohms, 470 ohms and 1,000 ohms.

A pin selection device 125 may also be included to select two individual conductors of the eight conductors of connector 103 for signal analysis. The pin selection device 125 may be a matrix of sixteen SPST switches.

The conductor selection device 106 may further include a power supply 127 for supplying power to the conductor selection device 106. An RS-232 interface module 130 may be supplied to control and monitor operation of a relay matrix board. A preferred relay matrix board has 64 DPST normally open, dry contact reed relays and provides all switching interfaces for the conductor selection device.

An AC/DC coupling device 133 having two 20 micro Farad capacitors is preferably included to protect the conductor selection device 106 from excessive currents. A further protection circuit may also be included to shunt stored current in the capacitors before switching between conductors.

Four Zener diodes 136 may be provided to protect the input stage of the analog-digital converter 118. In one embodiment of the present invention, the Zener diodes 136 preferably provide a 10 volt shunt to ground across selected conductors.

Finally, a differential probe 139 may be provided. The differential probe 139 provides high common mode rejection ratio for signal analysis once pairs of conductors have been determined.

The present invention also includes a computer readable storage medium 142. The storage medium 142 may be, for example, a computer disk such as a compact disk or floppy disk, read-only-memory or random-access memory. The storage medium 142 has encoded thereon computer readable instructions capable of instructing a computer to carry out the method described above. In particular, the encoded instructions are capable of instructing a computer to analyze signals carried by conductors connected to a communication pathway to determine which of the conductors are active conductors. The instructions are also capable of instructing the computer 115 to compare the active conductors to interface class information, and then determine whether the interface class information is similar to the active conductors. Finally, the instructions are capable of instructing the computer 115 to provide a first indication signal, the first indication signal being a first type if the interface class information is similar to the active conductor information, and the first indication signal being a second type if the interface class information is not similar to the active conductor information.

A preferred storage medium 142 also has computer readable instructions encoded thereon that are capable of instructing the computer 115 to analyze signals carried by conductors connected to a communication pathway, to determine which of the conductors are active conductors, and then group the active conductors into groups of active conductors, each group of active conductors having a pair of active conductors. The encoded instructions are also capable of instructing the computer 115 to compare group information to interface class information, wherein the group information includes information about the active conductors in each group, and the interface class information includes information about the pairing of conductors for a known interface class. Finally, the encoded instructions are capable of instructing the computer 115 to determine whether the interface class information is similar to the group information, and provide an indication signal indicating whether the interface class information is similar to the group information.

Although preferred embodiments of the present invention have been described and illustrated herein, the present invention is not limited to such preferred embodiments. Since various changes could be made without departing from the spirit and scope of the invention, it is intended that the foregoing description shall be interpreted as illustrative, and not interpreted in a limiting sense. Furthermore, it is intended that the present invention shall be limited only by the following claims.

What is claimed is:

1. A method of providing an indication signal, comprising:

providing a communication pathway carrying signals;

connecting the communication pathway to an interface device, the interface device having conductors for carrying the signals;

analyzing the signals carried by the conductors to determine which of the conductors are active conductors;

providing active conductor information, wherein the active conductor information includes a list of the active conductors;

providing primary interface class information, wherein the primary interface class information includes information about the active conductors for a known interface class;

determining whether the primary interface class information is similar to the active conductor information;

providing a first indication signal, the first indication signal being a first type if the information about the active conductors for the interface class is similar to the active conductor information, and the first indication signal being a second type if the information about the active conductors for the interface class is not similar to the active conductor information;

determining which conductors carry a signal having an alternate voltage; and determining an average amplitude voltage for each of the conductors carrying a signal having an alternating voltage.

2. The method of claim 1, wherein analyzing the conductors to determine which of the conductors are active conductors includes selecting a conductor;

analyzing the signal carried by the selected conductor to determine where a voltage of the signal carried by the selected conductor alternates; and determining the selected conductor is an active conductor if the voltage of the signal carried by the selected conductor alternates.

3. The method of claim 1, wherein the information about the active conductors for the interface class is similar to the active conductor information if the information about the active conductors for the interface class is among the active conductor information.

4. The method of claim 1, further comprising the step of determining a reference amplitude voltage.

5. The method of claim 4, further comprising the step of determining inactive conductors, wherein the inactive conductors are those conductors corresponding to determined average amplitude voltage values that are less than the reference amplitude voltage.

6. The method of claim 1, wherein determining the average amplitude voltage value for one of the conductors carrying a signal having an alternating voltage includes:

measuring the voltage amplitude of the signal carried by the one of the conductors at a plurality of discrete times during a first time period to provide a first array of voltage amplitudes;

measuring the voltage amplitude of the signal carried by the one of the active conductors at a plurality of discrete times during a second time period to provide a second array of voltage amplitude values;

selecting the maximum voltage amplitude from each array; and determining the average of the maximum voltage amplitude to provide the average voltage amplitude value.

7. The method of claim 1, further comprising the steps of:

grouping the active conductors into groups of active conductors, each group of active conductors having a pair of active conductors; and providing group information, wherein the group information includes information about the active conductors in each group.

8. The method of claim 7, wherein grouping the active conductors into groups includes:

determining possible pairs of active conductors;

determining auto correlation values corresponding to each possible pair of active conductors;

setting a threshold value; and eliminating one of the possible pairs of active conductors if the corresponding auto correlation value is less than the threshold value.

9. The method of claim 8, wherein determining the auto correlation value corresponding to each possible pair of active conductors includes:

selecting a possible pair of active conductors having a first active conductor and a second active conductor;

measuring a voltage amplitude of the signal carried by the first active conductor at a plurality of discrete times during a time period to provide a first array of voltage amplitudes corresponding to the first conductor;

squaring each measured amplitude in the first array corresponding to the first conductor and adding the squared measured amplitudes together to provide a first auto correlation value;

measuring a voltage amplitude of the signal carried by the second active conductor at the plurality of discrete times during the time period to provide a second array of voltage amplitudes corresponding to the second conductor;

squaring each measured amplitude in the second array and adding the squared measured amplitudes together to provide a second auto correlation value; and determining the auto correlation value corresponding to the selected possible pair of active conductors by determining the average of the first auto correlation value and the second auto correlation value.

10. The method of claim 8, wherein determining the auto correlation values corresponding to each possible pair of active conductors accounts for periodicity in signals carried by each possible pair of active conductors.

11. The method of claim 10, wherein determining the auto correlation values corresponding to each possible pair of active conductors includes:

selecting a possible pair of active conductors having a first active conductor and a second active conductor;

measuring a voltage amplitude of the signal carried by the first active conductor at a plurality of discrete times during a first time period to provide a first array of voltage amplitudes corresponding to the first conductor;

squaring each measured amplitude in the first array corresponding to the first conductor and adding the squared measured amplitudes together to provide a first auto correlation value;

measuring a voltage amplitude of the signal carried by the second active conductor at a plurality of discrete times during a second time period, different from the first time period, to provide a second array of voltage amplitudes corresponding to the second conductor;

squaring each measured amplitude in the second array and adding the squared measured amplitudes together to provide a second auto correlation value; and determining the auto correlation values corresponding to the selected possible pair of active conductors by determining the average of the first auto correlation value and the second auto correlation value.

12. The method of claim 8, wherein the threshold value is equal to a multiple of the lowest auto correlation value corresponding to one of the possible pairs of active conductors.

13. The method of claim 12, wherein the multiple is four.

14. The method of claim 7, wherein the primary interface class information is similar to the group information if the primary interface class information is among the group information.

15. A discovery device, comprising:

a switch interface device having a first connector including a first set of conductors, a conductor selection device and a second connector, the first connector being capable of connecting to a communication pathway and carrying signals from the communication pathway via the conductors, and the conductor selection device being connected to the first connector and the second connector; and a computer connected to the second connector and having software running thereon, the software being capable of instructing the computer to determine which of the conductors are active or inactive, the active conductors being those that carry the signals, the inactive conductors being determined by finding an average amplitude voltage for each of the conductors carrying a signal having an alternating voltage and comparing the average amplitude voltage to a reference amplitude voltage;

wherein the software is further capable of instructing a computer to compare a list of the active conductors to an interface class list, the interface class list identifying conductors used in transmitting signals according to the interface class, and if the list of the active conductors is similar to the interface class list, then instructing the computer to send a signal identifying the interface class.

16. The device of claim 15, wherein the software is further capable of instructing the computer to determine which conductors are carrying signals representing differentially driven data corresponding to the same signal, and capable of instructing the computer to group the conductors into conductor groups, each conductor group representing conductors carrying differentially driven data corresponding to the same signal.

17. The device of claim 16, wherein the software is further capable of instructing the computer to determine whether the conductors in each conductor group are similar to sets of conductors used in transmitting signals according to an interface class, and if the conductors in each conductor group are similar to the sets of conductors, then instructing the computer to send a signal identifying the interface class.

18. The device of claim 15, wherein the conductor selection device is capable of selecting between the conductors, and connecting some of the conductors to the second connector.

19. The device of claim 15, further comprising an attenuator connected between the first and second connectors for attenuating a signal carried between the first and second connectors.

20. The device of claim 19, wherein the conductor selector is capable of selecting two conductors, and the device further comprises a shunt load apparatus disposed between the two conductors.

21. A computer readable storage medium having encoded thereon computer readable instructions capable of instructing a computer to:

analyze signals carried by conductors connected to a communication pathway to determine which of the conductors are active conductors;

determine active conductor information, wherein the active conductor information includes a list of the active conductors;

compare the active conductor information to interface class information, wherein the interface class information includes information about the active conductors for a known interface class;

determine whether the interface class information is similar to the active conductor information;

provide an indication signal, the indication signal being a first type if the interface class information is similar to the active conductor information, and the indication signal being a second type if the interface class information is not similar to the active conductor information;

determine which conductors carry a signal having an alternate voltage; and determine an average amplitude voltage for each of the conductors carrying a signal having an alternating voltage.

22. A computer readable storage medium having encoded thereon computer readable instructions capable of instructing a computer to:

analyze signals carried by conductors connected to a communication pathway, to determine which of the conductors are active conductors;

determine which conductors carry a signal having an alternate voltage;

determine an average amplitude voltage for each of the conductors carrying a signal having an alternating voltage;

determine a reference amplitude voltage;

determine inactive conductors, wherein the inactive conductors are those conductors corresponding to determined average amplitude voltage values that are less than the reference amplitude voltage;

group the active conductors into groups of active conductors, each group of active conductors having a pair of active conductors;

compare group information to interface class information, wherein the group information includes information about the active conductors in each group, and the interface class information includes information about the grouping of conductors for a known interface class;

determine whether the interface class information is similar to the group information; and provide a first indication signal, the first indication signal being a first type if the interface class information is similar to the group information, and the first indication signal being a second type if the interface class information is not similar to the group information.

* * * * *